Patented Sept. 20, 1932

1,878,545

UNITED STATES PATENT OFFICE

JOHANN PAUL SCHMITTNÄGEL, OF BASEL, SWITZERLAND, ASSIGNOR TO NATIONAL ANILINE & CHEMICAL COMPANY, INC., OF NEW YORK, N. Y., A CORPORATION OF NEW YORK

PROCESS OF MAKING SUBSTITUTED GUANIDINES

No Drawing. Application filed January 24, 1927. Serial No. 163,305.

This invention relates to improvements in the production of substituted guanidines, and particularly diarylguanidines, such as diphenylguanidine, etc.

It is well known that diphenylguanidine in the form of its hydrochloride can be prepared by the action of cyanogen chloride on aniline in the absence of a solvent or diluent. It is also known that in the presence of anhydrous ether as a solvent cyanogen chloride reacts with aniline to form cyananilide (phenylcyanamide) and aniline hydrochloride, and it is further known that when cyananilide and aniline hydrochloride are heated to boiling in alcoholic solution they condense or interact with one another and produce diphenylguanidine hydrochloride.

For the preparation of diphenylguanidine neither of these processes appear to have come into general commercial use in large scale production. In both processes the cyanogen choride is prepared extraneously and then introduced in the gaseous state into the reaction mixture.

Moreover, among the disadvantages of the first process is the difficulty of carrying the reaction to completion without the external application of heat to keep the reaction mass in a condition sufficiently fluid to permit good agitation while introducing the gaseous cyanogen chloride into the aniline, and elevated temperatures tend to lessen the yield and quality of diphenylguanidine by increasing the amount of by-products formed.

The second process has the disadvantage of requiring the preparation of cyananilide in anhydrous ether solution, the separation and insolation of the cyananilide therefrom, and the subsequent treatment of the isolated cyananilide with aniline hydrochloride in alcoholic solution. The number of steps required in this process, together with the use and recovery of two different solvents, are obvious factors in making the process unsuitable for commercial use.

Further, aside from the hazards involved in using gaseous cyanogen chloride, both processes have the disadvantage of requiring one set of apparatus for making the cyanogen chloride and another set for making the diphenylguanidine or the cyananilide, or both.

The present invention contemplates the production of a substituted guanidine by providing a untary process wherein cyanogen chloride is produced in the presence of a suitable solvent therefor, and subsequently subjecting the solution of cyanogen chloride thus obtained to the action of an aromatic amine, more especially of the benzene series, under conditions which permit the formation of a substituted guanidine in the form of its hydrochloride. From the hydrochloride thus produced, the corresponding base can be obtained in any suitable manner.

In carrying out the present invention, cyanogen chloride is produced by treating an alkali metal cyanide, such as sodium cyanide, with chlorine in the presence of carbon tetrachloride, or other similar inert organic solvent or diluent, which preferably contains a small amount of an alcohol to promote the reaction. During the reaction of the chlorine on the cyanide, the solution is vigorously agitated and well-cooled, and preferably, the cyanide is in a finely pulverized condition. For the best results, the reagents and solvents employed in the reaction are preferably dry and practically free, or nearly so, from water. During the introduction of chlorine into the solvent containing the cyanide, the temperature is maintained below the boiling point of the cyanogen chloride, and preferably around or below 0° C. Approxmately the theoretical amount of chlorine required to react with the cyanide is employed, and the introduction of an excess of chlorine should be avoided.

To the well stirred solution of cyanogen chloride in the inert solvent thus obtained, and which is substantially free from water, there is then slowly introduced substantially the theoretical quantity of aniline or other amine which will react and combine with the cyanogen chloride to ultimately form the substituted guanidine hydrochloride, the temperature of the reaction-mass being maintained at a point such that no permanent loss of cyanogen chloride occurs. After all of the amine has been added, the mixture is heated for a time preferably under a cooled reflux condenser, and at a temperature preferably not higher than about 100° C., the solvent is subsequently removed by any appropriate means, as by distillation, and the substituted guanidine recovered in any suitable manner such as, for example, dissolving the hydrochloride in water and precipitating the free base by means of caustic soda.

The following example will further illustrate the invention, but it will be understood that the invention is not limited thereto. The parts are by weight.

*Example:*—In a vessel equipped with a reflux condenser, and agitator, and heating and cooling means, 50 parts of finely ground and dry sodium cyanide (96 to 98 percent purity) are suspended in about 300 parts of dry carbon tetrachloride containing about 0.5 part of ethyl alcohol (96 percent strength). The mixture is cooled to about −5° to +5° C., and then treated with a current of dry chlorine until about 70 parts are absorbed, the reaction mixture being well stirred and maintained at a temperature of about +5° to −5° C. After all of the chlorine has been added, and the mixture has been stirred for an additional 30 to 60 minutes or so, there is slowly added, with vigorous stirring 165 parts of dry aniline, the temperature being still maintained at about +5° to −5° C. After all of the aniline is added, the mixture is further stirred for an additional 30 to 60 minutes. It is then slowly heated and held at refluxing temperature for about 3 to 6 hours, after which the major part of the carbon tetrachloride is removed by direct distillation and the remaining portion by steam distillation. To the residue remaining in the vessel, and which should have about 500 parts of water present, there is added about 5 to 10 parts of decolorizing carbon and the solution then boiled for about 15 to 30 minutes. It is then filtered, and the filtrate at a temperature of about 35° C., poured, with stirring, into a 10 per cent solution of caustic soda containing about 33 parts of sodium hydroxide or a sufficient amount to combine with the hydrogen chloride and completely precipitate the diphenylguanidine. After cooling to about 15° C., the diphenylguanidine is filtered off, washed, and then dried at any suitable temperature, for example, at 40° to 60° C. The diphenylguanidine is thus obtained in excellent yields and of good quality.

In the above example, cyanogen chloride and sodium chloride are produced and the former dissolves in the carbon tetrachloride while the latter separates as an insoluble precipitate. It will be noticed that the latter is not removed from the solution by filtration, or otherwise, but that the mixture as a whole is treated with aniline.

It may be further pointed out that dry chlorine reacts very slowly, if at all, on the dry alkali metal cyanide in the presence of the inert organic solvent unless there is present a small amount of another substance which acts as a catalyst or a promoter to actuate or activate the reaction. While water promotes the reaction, its absence is desired later in the process during the condensation of the cyananilide with the aniline hydrochloride otherwise the yield and quality of the diphenylguanidine is apparently diminished. It has been found that alcohol acts as a suitable catalyst or adjuvant and that its presence does very little, if any, harm. The amount of alcohol employed can vary, for example, preferably from about one-tenth percent to one percent by weight of the inert solvent being used.

Upon the addition of aniline to the cyanogen chloride solution considerable heat is evolved and the temperature should not be permitted to rise to such a point that the reflux condenser fails to condense substantially all of the cyanogen chloride which may be evolved. With an efficient cooling system, the temperature of the reaction-mixture may rise to about 15° to 25° C., or higher, without harmful results. Preferably, the theoretical amount of aniline which will combine with the cyanogen chloride in the solution should be employed but more or less than this amount may be used. At the completion of the formation of the diphenylguanidine hydrochloride, the reaction-mixture may be subjected at once, if desired, to steam distillation for the removal of the carbon tetrachloride.

While the reaction which takes place between cyanogen chloride and aniline in the presence of carbon tetrachloride is not definitely known, the products formed apparently include cyananilide and aniline hydrochloride, and upon heating the solvent containing the mixture comprising these products there is formed diphenylguanidine hydrochloride. It will be noted that the cyananilide is not separated and isolated from the mixture and subsequently treated with aniline hydrochloride in another and different solvent. This feature is regarded as new and constitutes a part of the present invention.

It will be further noted that the preparation of the cyanogen chloride solution and its subsequent treatment with aniline is carried out in the same vessel and with the same solvent. Such a unitary procedure permits the employment of a compact apparatus. It will be understood, however, that the various reactions may be carried out, if desired, in different vessels.

It will be readily understood that in addition to the production of diphenylguanidine, the invention is adapted to the production of other substituted guanidines, or a mixture of substituted guanidines, by the employment of other amines (other than a tertiary amine)

instead of aniline, or by the employment of an admixture of amines. It is also evident that the process is applicable to the employment of bromine in place of chlorine, and by the term "a halogen having an atomic number between 17 and 35, inclusive," it is intended generically to include chlorine and bromine. Further, instead of carbon tetrachloride, other inert solvents may be employed, for example, certain halogen derivatives of the aliphatic hydrocarbons such as trichlorethylene, ethylene dichloride, tetrachlorethane, etc. The solvent employed should be one in which the cyanogen halide more or less readily dissolves and is substantially inert, or nearly so, to the action of halogen, and to an amine, under the conditions employed. In general, inert liquid solvents having a boiling point between about 70° and 100° C., are preferred. It is to be understood that the invention is not limited in the specification to the use of the particular ingredients mentioned in the example, and that no limitations should be imposed upon the appended claims other than required by prior art.

I claim:

1. In the production of a substituted guanidine, the process which comprises treating an alkali metal cyanide with a halogen having an atomic number between 17 and 35, inclusive in the presence of an inert organic solvent and of a small quantity of an alcohol as an adjuvant, treating the cyanogen halide solution thus obtained with an organic amine, other than a tertiary amine, and subsequently heating the mixture with production of the substituted guanidine in the form of its hydrohalide.

2. In the production of a substituted guanidine, the process which comprises treating an alkali metal cyanide with chlorine in the presence of an inert organic solvent and of a small amount of an alcohol as an adjuvant, treating the cyanogen chloride solution thus obtained with an aromatic amine other than a tertiary amine, and subsequently heating the mixture with production of the substituted guanidine in the form of its hydrochloride.

3. In the production of a diarylguanidine, the process which comprises treating sodium cyanide with chlorine in the presence of an inert organic solvent having a boiling point between about 70° and 100° C., treating the cyanogen chloride solution thus obtained with an aromatic primary amine at a temperature below the boiling-point of cyanogen chloride, and subsequently boiling the mixture, whereby diarylguanidine hydrochloride is formed.

4. In the production of a diarylguanidine, the process which comprises treating sodium cyanide with chlorine at a temperature of about −5° to +5° C., in the presence of an inert aliphatic chloride having a boiling-point of about 70° to 100° C., and a small amount of ethyl alcohol as an adjuvant, adding an aromatic primary amine of the benzene series to the mixture thus obtained and during the addition maintaining a temperature below the boiling-point of cyanogen chloride, and subsequently heating the reaction-mass to boiling.

5. In the production of diphenylguanidine, the unitary process which comprises treating sodium cyanide with chlorine in the presence of carbon tetrachloride and of a small amount of ethyl alcohol as an adjuvant at a temperature maintained at about −5° to +5° C., adding aniline to the mixture thus obtained and maintaining a temperature below about 25° C., and subsequently heating to boiling the reaction mass thus produced, whereby diphenylguanidine hydrochloride is formed.

6. In the production of diphenylguanidine, the improvement which comprises reacting aniline with cyanogen chloride in the presence of carbon tetrachloride with formation of cyananilide and aniline hydrochloride and subsequently heating the reaction mixture, without change to a different solvent, whereby diphenylguanidine hydrochloride is formed.

7. In the process of making a substituted guanidine by reacting cyanogen chloride in solution in an inert organic solvent with an organic amine, the process of preparing the solution of the cyanogen chloride in the inert solvent which comprises treating an alkali metal cyanide with chlorine in the presence of the inert solvent and a small quantity of an alcohol as an adjuvant.

8. In the process of making dipheylguanidine by reacting a carbon tetrachloride solution of cyanogen chloride with aniline, the process of preparing the carbon tetrachloride solution of cyanogen chloride which comprises treating sodium cyanide with chlorine in the presence of carbon tetrachloride and of about one-tenth per cent to one per cent of ethyl alcohol as an adjuvant.

9. In the production of a substituted guanidine, the step which comprises subjecting an aromatic amine other than a tertiary amine to the action of a cyanogen halide, the halogen in said halide having an atomic number between 17 and 35 inclusive, in the presence of trichlorethylene.

10. In the production of a substituted guanidine, the step which comprises subjecting an aromatic primary amine to the action of cyanogen chloride in the presence of tetrachlorethane.

In testimony whereof I affix my signature.

JOHANN PAUL SCHMITTNÄGEL.